May 27, 1924.
C. R. MacLEAN
1,495,523
CUTTING DEVICE FOR GLASS AND OTHER ARTICLES
Filed June 3, 1921
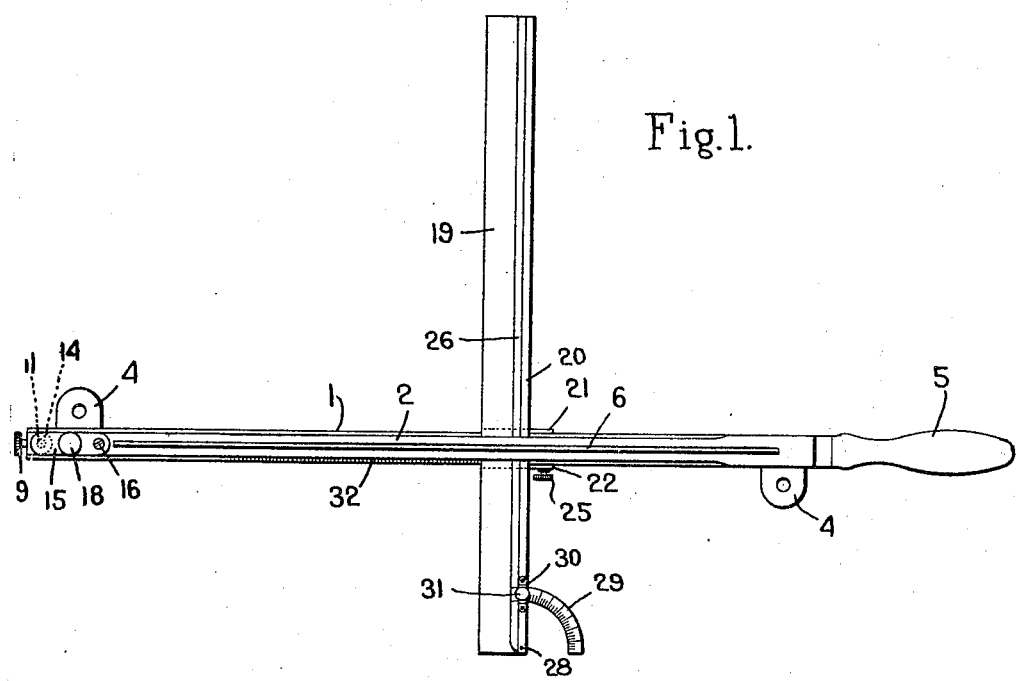
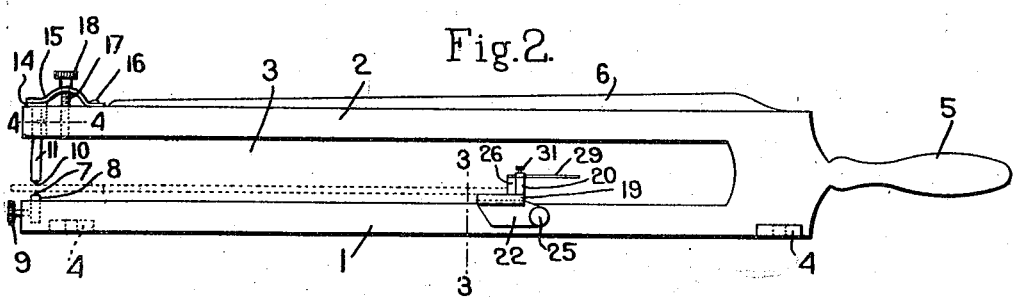
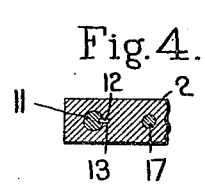
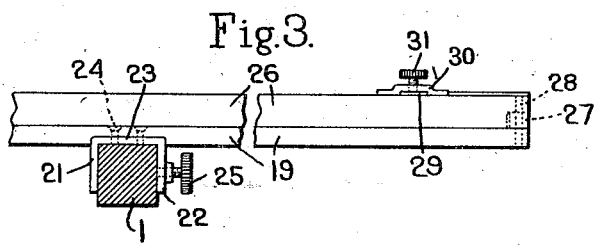
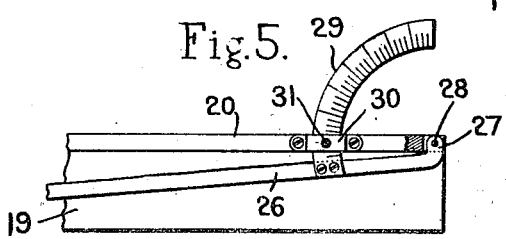
Inventor.
Clifton R. MacLean
by Heard Smith & Tennant
Attys.

Patented May 27, 1924.

1,495,523

UNITED STATES PATENT OFFICE.

CLIFTON R. MacLEAN, OF STOUGHTON, MASSACHUSETTS.

CUTTING DEVICE FOR GLASS AND OTHER ARTICLES.

Application filed June 3, 1921. Serial No. 474,670.

*To all whom it may concern:*

Be it known that I, CLIFTON R. MacLEAN, a citizen of the United States, and resident of Stoughton, county of Norfolk, State of Massachusetts, have invented an Improvement in Cutting Devices for Glass and Other Articles, of which the following description, in connection with the accompanying drawing, is a specification, like characters on the drawing representing like parts.

This invention relates to improvements in devices for cutting glass and other articles and the principal object thereof is to provide a device comprising cutting instrumentalities adapted to engage and score opposite faces of the article to be cut.

A further object of the invention is to provide a device for cutting glass or other articles comprising a pair of cutting instrumentalities in axial alinement and disposed to engage opposite faces of the material to be cut with means for adjustably, and also preferably yieldably and adjustably, forcing one of said instrumentalities toward the other whereby both surfaces of the glass or other article may be cut or scored to a desired depth.

A further object of the invention is to provide a device for cutting plates of glass and other articles with means for cutting both sides of said article and also with means for guiding the edge of the plate of glass during the cutting operation.

Another object of the invention is to provide an adjustable guide by means of which the plate of glass or other article may be cut at an angle to its longitudinal axis.

A further feature of the invention consists in providing a graduated sector so disposed that the guide may be set readily in any desired angular position.

Other objects and features of the invention will more fully appear from the following description and the annexed drawing and will be particularly pointed out in the claims.

A preferred embodiment of my invention is illustrated herein as applied to a device for cutting glass and other articles in the form of sheets.

In the drawings:

Fig. 1 is a plan view of a glass cutting device of the character described;

Fig. 2 is a side elevation of the same;

Fig. 3 is a section through the base portion of the frame on line 3—3, Fig. 2, viewed from the left toward the right, portions of the support and guide being broken away;

Fig. 4 is a horizontal sectional view of the end of the overhanging arm on line 4—4, Fig. 2; and Fig. 5 is a plan view of the support for the edge of the plate being cut showing the angularly adjustable guide pivotally mounted thereon.

The preferred embodiment of the invention illustrated herein comprises a frame 1 which includes an overhanging arm 2 carrying at its end a suitable cutting instrumentality which co-operates with another cutting instrumentality carried by the base. The overhanging arm 2 preferably extends in parallelism with the base and provides a space 3 into which the sheet of glass or other article to be cut may extend in order that the cutting instrumentalities may engage the desired portion of the glass along which the line of cutting is to extend.

The base desirably is provided with ears 4 by means of which it can be attached to a table or other support and also may be provided with a handle 5 so that the cutting device may be used as a hand tool. The overhanging arm 2 may if desired be so constructed as to be slightly resilient and thereby to produce a sufficient pressure of the cutting instrumentalities upon the plate to enable them properly to score the plate. Preferably, however, the overhanging arm 2 is of rigid construction and may be provided with a longitudinal strengthening rib 6. A lower cutting instrumentality, such as a diamond point 7, mounted in a post 8, is fixedly secured in a suitable socket in the free end of the base by a set screw 9 or in any other suitable manner. The upper co-operating cutting instrumentality comprises a similar diamond point 10 mounted in the end of a post or rod 11 which is slidably journalled in a suitable socket in the free end of the arm 2.

The axes of the posts 8 and 11 desirably are in alinement so that the cutting points 10 and 7 will engage opposite faces of the plate to be cut at exactly opposite points so that a line scored by these cutting points will enable the plate to be broken in a well defined line. The upper post or rod 11 desirably is provided with a feather or pin 12 which engages a suitable slot 13 extending from the bearing in which the post is mounted. The feather or pin 12 thus prevents rotation of the post 11.

The upper end of the post 11 desirably is provided with an enlarged head 14 which limits the downward movement of the cutting instrumentality and also provides a bearing surface for the free end of a leaf spring 15, the opposite end of which is secured to the overhanging arm by rivets 16 or other suitable fastenings.

By reason of this construction the upper cutting instrumentality may be raised sufficiently to permit the introduction of the plate of glass or other material and when released will bear upon the plate with sufficient pressure to cause the points 10 and 7 to score the glass as it is moved transversely of said cutting instrumentalities sufficiently to produce an easy breaking line.

An adjusting screw 17 provided with a milled head 18 desirably passes through the central portion of the spring 15 and provides means by which the amount of pressure produced between the cutting instrumentalities and the glass may be adjusted.

It is desirable that means may be provided for guiding the glass through the cutting device when the cutting device is secured to a support or for guiding the cutting device when it is used as a hand tool. In the preferred construction illustrated herein a support for the glass in the form of a flat plate 19 having an upwardly turned flange 20 is secured to the base preferably at right angles to the longitudinal axis of the base. In order to provide for adjusting the same toward and from the cutting instrumentalities webs 21 and 22 are provided which extend downwardly from the under face of the support 19 and embrace the sides of the base 1. As illustrated in Fig. 3 the webs 22 form parts of a bracket having a connecting portion 23 which is secured to the support 19 by suitable screws 24 or other fastening. A set screw 25 passing through one of said webs serves to clamp the support 19 in adjusted position. The upwardly extending flange 20 may serve as a guide for the edge of the plate which is carried upon the upper surface of the support 19.

It is frequently desirable to cut plates at an angle to one of the edges of the plate and in the present invention means are provided for guiding the edge of the plate at an angle to the longitudinal axis of the frame and overhanging arm. The preferred embodiment of the invention illustrated comprises a guide 26 which normally extends in parallelism with and lies against the flange 20 of the support 19. The guide 26 is provided with an offset end 27 which is pivotally mounted upon a stud 28 preferably located in the central longitudinal plane of the flange 20 so that the guide may be adjusted at a desired angle about said center.

In order to determine the angle between the longitudinal axis of the flange 20 and the guide 26, an arcuate sector 29 is provided which is concentric with the pivot 28 upon which the guide 26 is mounted. The arcuate sector may be graduated in degrees of angle so that a desired angular adjustment of the guide may be readily and accurately made.

Suitable means are provided for clamping the guide in adjusted position. A convenient device which is illustrated herein comprises a keeper or strap 30 which is secured to the flange 20 and embraces the sector 29. The strap 30 is provided with a clamping screw 31 adapted to be screwed down upon the face of the sector when the proper adjustment has been made.

If desired the base may be provided with suitable graduations 32, the numerals of such graduations preferably running from the zero point in the plane of the cutting instrumentalities toward the handle portion of the instrument.

In the operation of the machine the support 19 and guide 26 are positioned at a distance from the cutting instrumentalities corresponding to the width of the piece which is to be cut from the plate. The support is then clamped by turning up the set screw 25. The movable cutting instrumentality 11 is then raised sufficiently to permit the plate to be introduced between the cutting instrumentality and the plate shoved through with its edge abutting against the guide 26. If the cut is to be parallel to the edge which is carried by the support 19 it is merely necessary to shove the plate along with the edge in contact with the guide, or to pull the cutting device along the edge of the plate.

If an angular cut is desired the guide 26 may be moved through an angle, as indicated by the arcuate sector, complementary to the angle at which it is desired to cut the glass relatively to an edge of the glass which may be considered the base. This base edge is then placed against the guide 26 and the set screw 25 released to permit the support for the glass to slide longitudinally of the frame 1. The edge of the glass opposite the base is then introduced between the cutters 7 and 10 and the glass and support moved laterally, toward the left, thus producing the angular cut desired. It will be noted that this cut will not extend completely to the edge of the glass, but the glass may be pulled between the cutters with sufficient accuracy to complete the cut to the base edge.

An approximately accurate angular cut may also be made by setting the guide at the desired angle, then placing the upper corner of the glass against the guide 26 and thereafter forcing the corner of the glass along the guide 26 at the same time keeping the edge of the glass in parallelism with the flange 20 of the support 19.

It will be understood that the particular embodiment of the invention illustrated herein is merely illustrative and not restrictive and that the invention embodies any cutting device for plates of glass or other articles in which a pair of oppositely disposed cutting instrumentalities engage opposite faces of the plate so that both sides of the plate are scored simultaneously by the cutting instrumentalities. It is also to be understood that various changes in the construction and arrangements of the guiding mechanism and the adjusting means may be made within the spirit and scope of the following claims.

Having thus described my invention, what I claim as new, and desire to secure by Letters Patent, is:

1. A glass cutting device comprising a frame having a base and an overhanging arm providing a free space therebetween, a lower cutting instrumentality rigidly mounted in said base, a co-operating upper cutting instrumentality mounted in said arm in axial alinement with the lower cutting instrumentality and resilient means acting to force the upper cutting instrumentality toward the lower cutting instrumentality.

2. A glass cutting device comprising a frame having a base and an overhanging arm providing a free space therebetween, a lower cutting instrumentality mounted in said base adjacent the end thereof, a co-operating upper cutting instrumentality sildably mounted in said arm in axial alinement with said lower cutting instrumentality, a spring engaging said upper instrumentality and acting to force the same toward said lower cutting instrumentality and means for adjusting the tension upon said spring.

3. A glass cutting device comprising a frame having a base and an overhanging arm providing a free space therebetween, co-operating cutting instrumentalities mounted in axial alinement in said base and in the free end of said overhanging arm, and positioned to engage opposite faces of a plate of glass, a support slidably mounted on said base disposed in perpendicular relation to the longitudinal axis of said base, means for securing said support in adjusted positions and a guide pivotally mounted on said support and adjustable in angular relation thereto.

4. A glass cutting device comprising a frame having a base and an overhanging arm providing a free space therebetween, co-operating cutting instrumentalities mounted in axial alinement in the free ends of said base and overhanging arm, and positioned to engage opposite faces of a plate of glass, a support slidably mounted on said base, a longitudinal flange on said support extending at right angles to said base, a guide pivotally mounted on said support adapted to engage the edge of the plate of glass and a graduated sector concentric with the pivot of said guide adapted to indicate the angular position of said guide relatively to said flange and means for clamping said guide in adjusted positions.

In testimony whereof, I have signed my name to this specification.

CLIFTON R. MacLEAN.